United States Patent
Huggins et al.

(10) Patent No.: US 9,771,458 B2
(45) Date of Patent: Sep. 26, 2017

(54) REACTIVE FUNCTIONAL SILOXANE COMPOSITIONS

(71) Applicant: Momentive Performance Materials GmbH, Leverkusen (DE)

(72) Inventors: John Huggins, Leverkusen (DE); Hubertus Eversheim, Wermelskirchen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 15/027,255

(22) PCT Filed: Oct. 8, 2014

(86) PCT No.: PCT/EP2014/071528
§ 371 (c)(1),
(2) Date: Apr. 5, 2016

(87) PCT Pub. No.: WO2015/052229
PCT Pub. Date: Apr. 16, 2015

(65) Prior Publication Data
US 2016/0251483 A1    Sep. 1, 2016

(30) Foreign Application Priority Data
Oct. 8, 2013 (EP) .................................. 13187718

(51) Int. Cl.
*C08K 5/04* (2006.01)
*C08G 77/448* (2006.01)
*C08K 3/10* (2006.01)
*C08G 64/18* (2006.01)
*C08K 5/09* (2006.01)
*C08K 5/098* (2006.01)
*C08L 83/10* (2006.01)
*C08G 77/16* (2006.01)

(52) U.S. Cl.
CPC ......... *C08G 77/448* (2013.01); *C08G 64/186* (2013.01); *C08G 77/16* (2013.01); *C08K 3/10* (2013.01); *C08K 5/09* (2013.01); *C08K 5/098* (2013.01); *C08L 83/10* (2013.01)

(58) Field of Classification Search
CPC .............................. C08G 77/448; C08G 77/16
USPC .......................................................... 524/396
See application file for complete search history.

(56) References Cited

U.S. PATENT DOCUMENTS

| | | | |
|---|---|---|---|
| 3,189,662 A | 6/1965 | Vaughn, Jr. | |
| 3,328,350 A | 6/1967 | Omietanski et al. | |
| 3,442,854 A | 5/1969 | Curtius et al. | |
| 4,584,360 A | 4/1986 | Paul et al. | |
| 4,732,949 A * | 3/1988 | Paul .................... | C08G 77/448 525/464 |
| 5,126,495 A | 6/1992 | Serini et al. | |
| 5,227,449 A | 7/1993 | Odell et al. | |
| 5,319,066 A | 6/1994 | King, Jr. | |
| 5,340,905 A | 8/1994 | Kühling et al. | |
| 5,399,659 A | 3/1995 | Kühling et al. | |
| 5,412,061 A | 5/1995 | King, Jr. et al. | |
| 5,504,177 A | 4/1996 | King, Jr. et al. | |
| 5,783,651 A | 7/1998 | König et al. | |
| 5,821,321 A * | 10/1998 | Archey ................. | C08G 63/64 528/196 |
| 6,066,700 A | 5/2000 | König et al. | |
| 6,506,871 B1 | 1/2003 | Silvi et al. | |
| 6,753,405 B2 | 6/2004 | Kratschmer et al. | |
| 8,466,249 B2 | 6/2013 | Gallucci et al. | |
| 8,829,140 B2 | 9/2014 | Huggins et al. | |
| 2004/0220330 A1* | 11/2004 | DeRudder ............ | C08G 64/186 524/837 |
| 2012/0296051 A1 | 11/2012 | Huggins et al. | |
| 2013/0224462 A1* | 8/2013 | van der Mee ......... | C09K 21/14 428/220 |

OTHER PUBLICATIONS

International Search Report for corresponding PCT/EP2014/071528 mailed Dec. 17, 2014, three pages.
International Preliminary Report on Patentability for corresponding PCT/EP2014/071528 mailed Apr. 21, 2016, eight pages.

* cited by examiner

*Primary Examiner* — Hui Chin
(74) *Attorney, Agent, or Firm* — Rankin, Hill & Clark LLP

(57) ABSTRACT

Disclosed herein are compositions, comprising linear polydiorganosiloxanes having enhanced reactivity and their use to prepare polydiorganosiloxane-polyorgano block copolymers.

14 Claims, No Drawings

REACTIVE FUNCTIONAL SILOXANE COMPOSITIONS

FIELD OF THE INVENTION

The present invention relates to a composition comprising linear α,ω-functional polydiorganosiloxanes having enhanced reactivity. The present invention also relates to polydiorganosiloxane-polyorgano block copolymers made from the linear α,ω-functional polydiorganosiloxanes of enhanced reactivity and the processes of making the block copolymers.

BACKGROUND OF THE INVENTION

Linear hydroxyaryl-functional polydiorganosiloxanes are useful starting materials for making polydiorganosiloxane-polyorgano block copolymers. These block copolymers are known to have many unique properties and useful applications. For example, polydimethylsiloxane-polycarbonate block copolymers exhibit good low temperature impact resistance, making them useful materials for the manufacture of helmets.

There are two general pathways known to prepare polydiorganosiloxane-polyorgano block copolymers from linear hydroxyaryl-functional polydiorganosiloxanes. Linear hydroxyaryl-functional polysiloxanes react with bisphenolic compounds or their polycarbonate, polyester, polyetherimide, polyether ether ketone, or polysulfone oligomers and a polycarbonate precursor under the conditions of a two-phase boundary polycondensation process. Alternatively, linear hydroxyaryl-functional polysiloxanes react with bisphenolic compounds or their polycarbonate, polyester, polyetherimide, polyether ether ketone, or polysulfone oligomers and a diorganocarbonate or an organic diester in a solventless, transesterification melt process. Both processes lead to block copolymers, wherein the polysiloxane block is bonded to the polyorgano block by either a carbonate or an ester linkage.

The aforementioned processes that employ the two-phase boundary polycondensation process in the preparation of polysiloxane-polyorgano block copolymers have the disadvantage that this process requires the use of large amounts of organic solvents or highly toxic phosgene. Furthermore, the preferred solvents in the two-phase boundary polycondensation process are halogenated hydrocarbons or halogenated aromatics, such as dichloromethane or chlorobenzene. Handling of large amounts of these solvents is undesirable for environmental, health and safety reasons. The solventless melt process for the preparation of polysiloxane-polyorgano block copolymers has the advantage of requiring no solvents and fewer or no subsequent purification steps. It is, therefore, advantageous that the polysiloxane used in the preparation of said block copolymers by the solventless melt process be free of unwanted impurities that could be detrimental to the properties of the resulting block copolymers. Non-limiting examples of such unwanted impurities are strong bases, inorganic salts, such as in particular the salts of hydroxy or halogen ions, amines and heavy metals. Accordingly there is a need for linear hydroxyaryl-terminated polydialkylsiloxanes of controlled structure that are free of unwanted impurities.

Furthermore, the solventless melt process to polysiloxane-polyorgano block copolymers is an inherently biphasic system, wherein even after formation of the block copolymers the siloxane portion builds a distinct disperse phase. It was found that highly pure hydroxyaryl-terminated polysiloxanes exhibit poor reactivity in the solventless melt process, in particular in the reaction with polycarbonate, polyester, polyetherimide, polyether ether ketone, or polysulfone oligomers, even in the presence of known transesterification catalysts, leading to excessively long reaction times and added costs. This poor reactivity is particularly undesirable in continuous melt processes, such as in an extrusion process according to U.S. Pat. No. 6,506,871. Adding excessive amounts of known transesterification catalysts to increase reactivity is undesirable, as the resulting high levels of catalyst residues can have detrimental effects on the properties of the block copolymers. Accordingly, there remains the need for a solventless melt process of high reactivity, employing low levels of catalysts, and providing for polysiloxane-polyorgano block copolymers with optimal properties.

U.S. Pat. Nos. 3,189,662 and 3,328,350 describe the reaction of chloro-terminated polysiloxanes with bisphenolic compounds and phosgene to form polysiloxane-polycarbonate block copolymers, eliminating hydrochloric acid as the byproduct. This process has the disadvantages of requiring the use of large amounts of a basic compound to neutralize the hydrochloric acid byproduct and a tedious filtration to remove the large amount of resulting salt.

U.S. Pat. Nos. 4,584,360 and 4,732,949 describe the reaction of bisphenolic compounds with α,ω-bisacyloxy-polydimethylsiloxanes to form hydroxyaryloxy-terminated polyorganosiloxanes. In a subsequent step the hydroxyaryloxy-terminated polysiloxane is reacted with the excess bisphenolic compound and a carbonate precursor, such as phosgene, and stoichiometric amounts of an inorganic base, under the conditions of the two-phase boundary polycondensation process, to form block copolymers. According to the '360 and the '949 patents, the preferred inorganic bases are alkali metal and alkaline earth metal carbonates.

In order to dissolve the large excess of bisphenolic compounds used, the process disclosed in the '360 and the '949 patents requires the use of large amounts of organic solvents, typically chlorinated organic solvents. Removal of the large amounts of solvents by distillation increases manufacturing costs. Furthermore, the base used in the reaction mixture forms salts, which are difficult to be completely removed from the block copolymer product. Similarly, isolation of hydroxyaryloxy-terminated siloxanes according to these processes in a pure form which are free of undesirable impurities is tedious and costly.

U.S. Pat. Nos. 3,442,854, 5,319,066, 5,340,905, 5,399,659, 5,412,061, 6,506,871, 6,753,405 describe methods for preparing thermoplastic polycarbonate polymers by a solventless melt process, wherein the catalysts are employed. U.S. Pat. Nos. 5,227,449, 5,504,177, 5,783,651, 8,466,249, 8,829,140 describe methods for preparing polysiloxane-polycarbonate blockcopolymers by a solventless transesterification processes.

U.S. Pat. No. 5,126,495 describes polyester-polycarbonate-polysiloxane triblock copolymers starting from hydroxyaryloxy-functional polysiloxanes.

U.S. Pat. No. 6,066,700 describes a process for preparation of polysiloxane-polycarbonate block copolymers by solventless melt transesterification comprising reacting an oligocarbonate and a hydroxyaryloxy-functional siloxane in the presence of a catalyst.

The inventors found surprisingly that the presence of certain levels of inorganic and/or organic salts in the polysiloxane polymer prior to the formation of the reaction mixture with the polyorgano oligomers result not only in an improved reactivity but also in polysiloxane-polyorgano copolymers of improved properties in particular good melt stability, improved solvent and hydrolysis stability and improved low temperature impact resistance. It is especially remarkable, that high yields of copolymer formation are achieved with very low levels of said salts in particularly short reaction times. It is equally remarkable, that said salts do not negatively impact the melt stability of the copolymer.

SUMMARY OF THE INVENTION

Accordingly the present invention provides compositions comprising linear functionalized polydiorganosiloxanes of controlled structure and constitution and enhanced reactivity which are particulary useful in the solventless melt process to make polysiloxane-polyorgano block copolymers. Surprisingly, it was found that incorporation of certain levels of salts of organic and inorganic compounds into the linear functionalized polysiloxanes lead to drastically enhanced reactivity between the linear functionalized polysiloxanes, like e.g. hydroxyhydrocarbyl-terminated polysiloxanes, and oligomeric in particular carbonate-terminated polymers in a solventless melt process thereby achieving block copolymers as described above. Surprisingly these salts of organic and inorganic compounds were found to have no detrimental effects upon properties of the resulting block copolymers. The observed rate of the transesterification reaction between in particular hydroxyhydrocarbyl-terminated polysiloxanes and oligomeric in particular carbonate-terminated polymers far exceeds what is observed in the absence of the salts.

In the melt process to prepare the polysiloxane-polyorgano block copolymers the reaction mixture is a siloxane/organic (polymeric) two-phase system throughout. Without being bound by theory, it is believed that the salts in the siloxane phase interact with the functional groups of the polysiloxanes and thus the transport to the siloxane-to-organic phase interface is facilitated whereby the reaction rate is enhanced. On the other hand if these low levels of the salts are first incorporated into the organic (polymeric) phase, then the transport to the reactive interface is inhibited.

Furthermore, surprisingly the resulting polydiorganosiloxane-polyorgano block copolymers were found to exhibit extraordinarily good physical properties, such as melt stability, solvent and hydrolysis resistance.

Accordingly in one aspect, the present invention provides a composition comprising:
(A) one or more polydiorganosiloxanes selected from the formulas (I) and (II):

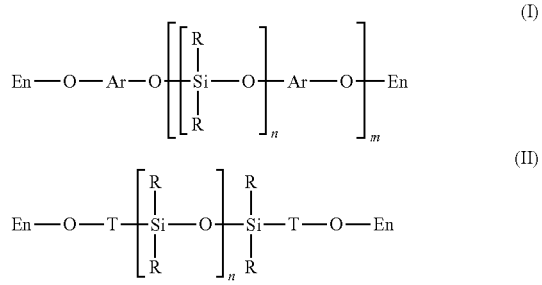

with the substituents groups as defined in the claims or below, and
(B) 0.02 to 5.0 mmol/kg of the total of weight of (A) and (B) of one or more organic or inorganic salts. An organic salt comprises suitably at least one carbon atom binding to carbon and/or hydrogen, whereas the inorganic salt suitably does not comprise such a carbon atom.

"One or more" in this context and in the entire application may include for example preferably one, two or three. The composition according to the invention preferably consists essentially of the components (A) and (B). Preferably the composition according to the invention does not contain more than 10 wt-%, more preferably not more than 5 wt-% and still more preferably not more than 1 wt-% of any other compounds apart from (A) and (B), based on the total amount of the composition. More preferably the composition according to the invention consists of (A) and (B). As shown below the composition of the invention comprising the components (A) and (B) is formed first, in particular, before the polymer to be modified with the polydiorganosiloxane (A) is added and the modification reaction (sometimes referred to herein also as "polymer formation reaction" or "preparation of polydiorganosiloxane-polyorgano block copolymers") which optionally uses a catalyst is started. That is, the composition according to the invention normally does not include the polymer to be modified with the polydiorganosiloxane (A) or any other component added to carry out the modification or polymer formation reaction, respectively, like e.g. a catalyst for the modification or polymer formation reaction. The composition according to the invention apart from components (A) and (B) may contain however the polar organic compound or solvent respectively, or parts thereof, which polar organic compound is used to aid the incorporation of component (B) into component (A), in particular, insofar such polar organic compound does not disturb the subsequent polymer formation reaction, where it is essentially removed.

In formulas (I) and (II) the substituent groups are defined in the following:

En is independently selected from the group consisting of hydrogen and —C(=O)—OR$^1$, wherein R$^1$ is selected from the group consisting alkyl, alkylaryl, and aryl groups, each group having up to 30 carbon atoms. En being hydrogen is preferred. In case of En being —C(=O)—OR$^1$ the resulting end groups are carbonate groups.

Examples of alkyl include in this context and in the entire application in particular linear, branched and/or cyclic alkyl groups having up to 30, preferably up to 10 carbon atoms, like $C_1$-$C_{10}$-alkyl, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl.

Preferred groups R$^1$ are aryl and alkylaryl groups having up to 30, preferably up to 20 carbon atoms. "Aryl" in this context and in the entire application shall include carbocyclic aromatic radical having up to 30 carbon atoms. The same applies to the aromatic moiety of an alkylaryl radical. Examples of "aryl" include phenyl, naphthyl, phenanthrenyl, anthracenyl or fluorenyl.

Alkylaryl groups are alkyl-substituted aryl groups, wherein with respect to alkyl and aryl it can be referred to the above definitions. Preferred alkylaryl groups include o-, p-, m-tolyl, o-, p-, m-tert.-butylphenyl.

T is independently selected from the group consisting of divalent optionally substituted hydrocarbyl residues having up to 60 carbon atoms, optionally comprising one or more heteroatoms, preferably oxygen, said group T being bond to Si and O-En via a carbon atom, and said groups T are selected from
(Si shown for indicating binding direction of T):

Si-(alkyl)-(aryl)-

Si-(alkyl)-O-(aryl)-

Si-(alkyl)-O—C(O)-(aryl)-, and

Si-(alkyl)-O-(alkyl)-.

Therein "alkyl" and "aryl" each represent divalent moieties, having preferably up to 20 carbon atoms. Preferred divalent alkyl residues include —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—. Preferred divalent aryl residues include 1,2- or 1,3- or 1,4-phenyldiyl (sometimes referred to as phenylene), optionally having an alkoxy substituent, preferably one methoxy substituent. With respect to "alkyl" and "aryl" in the definition of T it can be also referred to the examples of "alkyl" and "aryl" indicated for $R^1$ above.

Substituents of T include preferably 1 to 3 substituents selected from C1-C4-alkyl, in particular methyl and butyl, and C1-C4-alkoxy, in particular methoxy.

Ar is independently selected from the group consisting of divalent aromatic residues having up to 60, preferably up to 40 carbon atoms which can be independently from each other substituted with a substituent selected from the group consisting of halogen, alkyl and alkoxy groups. Preferred divalent aromatic residues comprise any divalent substituted or unsubstituted hydrocarbyl residues which contain at least one aromatic group, preferably one or two aromatic groups, like in particular a phenyl group. Preferred Ar are indicated below.

R is an organic group having up to 30 carbon atoms, preferably alkyl as defined before, aryl as defined before, arylalkyl, wherein aryl is as defined before and alkyl is in this context is a divalent alkyl group, the preferred examples of which include the same as monovalent alkyl above, except for the presence of a further free valence, cycloalkylalkyl, wherein cycloalkyl is as defined above and alkyl is a divalent alkyl group as just mentioned. More preferred R is methyl, phenyl, phenyl-ethyl-, and phenyl-propyl-. Most preferred are methyl and/or phenyl.

n is an average value of from 10 to 400, preferably 10 to 100, more preferably 10 to 50 and even more preferably 12 to 50.

m is an average value of from 1 to 10, preferably 2 to 5.

The composition according to the invention comprises (B) 0.02 to 5.0, preferably 0.04 to 3, more preferably 0.04 to 1.0 mmol/kg of the total of weight of (A) and (B) of one or more organic or inorganic salts.

A preferred method of determining the content of the component (B) in case of alkaline and earth alkaline salts is the determination via AAS (Atomic Absorption Spectroscopy) with flame atomization. In case of ammonium and phosphonium salts the content is determined via determination of nitrogen and phosphorus content in a usual manner.

Preferred organic or inorganic salts include organic or inorganic salt of an acid having suitably a pKA value within the range of from 3 to 7 (25° C.). Suitable acids include carboxylic acids, preferably C2-C22 carboxylic acids, such as acetic acid, propionic acid, oleic acid, stearic acid, lauric acid and benzoic acid, partial esters of polycarboxylic acids, such as mono- or diorgano phosphoric acid esters, branched aliphatic carboxylic acids, such as 2,2-dimethylpropanoic acid, 2,2-dimethylbutanoic acid and 2,2-dimethylpentanoic acid. Useful organic and inorganic salts are or are derived from sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, disodium, dipotassium and dilithium salts of bisphenol A. Furthermore the salts may include calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the respective oleates. These salts may be used singly or in combination.

Preferred organic or inorganic salts are selected from the group consisting of alkali metal salts, (preferably sodium, potassium, cesium salts), earth alkaline metal salts, (preferably magnesium, calcium salts), quaternary ammonium salts (preferably tetra-(n-butyl)-ammonium, tetraphenylammonium, tetrabenzylammonium, cetyltrimethylammonium) and quaternary phosphonium salts ((preferably tetra-(n-butyl)-phosphonium, tetraphenylphosphonium, tetrabenzylphosphonium, cetyltrimethylphosphonium). Most preferred are alkali metal salts and quaternary phosphonium salts salts, preferably in each case of carboxylic acids which preferably have up to 30 carbon atoms.

In a further preferred embodiment the organic or inorganic salts are selected from the group consisting of salts of weak acids having a $pK_A$ of 3 to 7, preferably 3 to 6, more preferably 3.5 to 5.5 (25° C. in water as solvent).

As is generally known by the skilled persons in the art the $pK_A$ is defined as the logarithmic constant, which is equal to $-\log_{10} K_a$:

$$pK_a = -\log_{10} K_a$$

wherein $$K_a = \frac{[A^-][H^+]}{[HA]}.$$

Preferred weak acids include carboxylic acids, like e.g. C2-C22 carboxylic acids, like acetic acid, propionic acid, oleic acid, stearic acid, lauric acid, benzoic acid, 4-methoxybenzoic acid, 3-methylbenzoic acid, 4-tert-butylbenzoic acid, p-tolylacetic acid, 4-hydroxybenzoic acid, salicylic acid, partial esters of polycarboxylic acids like dicarboxylic acids, such as monoesters of succinic acid, partial esters of phosphoric acid, e.g. mono- or diorgano phosphoric acid esters, branched aliphatic carboxylic acids, like 2-ethylhexanoic acid, or 2,2-dimethylpropanoic acid, 2,2-dimethylbutanoic acid, 2,2-Dimethylpentanoic acid, commercially available e.g. as "versatic acids".

Preferred organic or inorganic salts are selected from the group consisting of alkali metal salts and phosphonium salts of carboxylic acids and partial esters of phosphoric acid.

In a preferred embodiment n is an average value of from 10 to 50 and the product of n times m is 15 to 200, preferably less than 150.

In a preferred embodiment Ar is represented by the following formula (III):

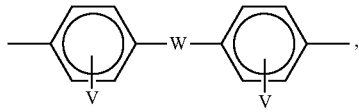
(III)

wherein W is selected from the group consisting of a single bond, an oxygen atom, a carbonyl group, a sulphur atom, a $SO_2$ group, a divalent C1-C20 (preferably C1 to C3) aliphatic radical and/or a divalent C5-C20 cycloaliphatic radical (e.g. those comprising cyclohexyl moieties) and V shall represent the substituent groups at the phenyl moieties which are independently selected from the group consisting of hydrogen, C1-C20 alkyl, C1-C20 alkoxy and halogen atoms. With respect to preferred alkyl or alkoxy groups it can be referred to the examples given above.

In another preferred embodiment Ar is selected from:

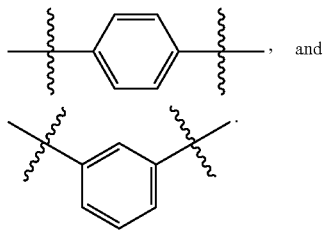
and which groups Ar may be present in combination with residues of formula (III).

Preferred compounds of the formula (III) are selected from the group consisting of:

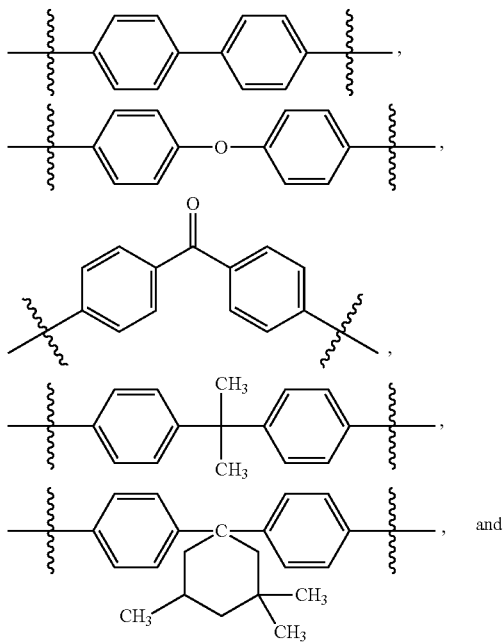
and

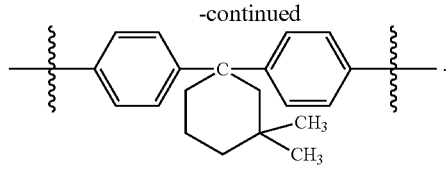

The present invention further relates to a process for preparing polydiorganosiloxane-polyorgano block copolymers, wherein the process comprises reacting a composition according to the invention with a polymer selected from the group, consisting of polyester having repeating units consisting of the group of the general formulas:

a) $-[R^2-C(=O)-O-]_x-$, wherein x is at least 2, and $R^2$ is independently selected from optionally substituted divalent organic residues having up to 30 carbon atoms, which are bound via a carbon atom to the adjacent carbonyl carbon atom, and b) $-[R^3-O-C(=O)-R^4-C(=O)-O-]_x-$, wherein x is at least 2, $R^3$ is independently selected from optionally substituted divalent organic residues having up to 30 carbon atoms, and R4 is independently selected from optionally substituted divalent organic residues having up to 30 carbon atoms, which are bound via a carbon atom to the adjacent carbonyl carbon atom, polyetherimide (PEI), polyether ether ketone (PEEK), and polysulfone, and optionally one or more compounds selected from the group consisting of bisphenolic compounds, diorganocarbonates and organodiesters, in a solventless melt with removal of by-products by distillation. Such process is preferably carried in the presence of a catalyst, and the temperature is preferably in the range of 160 and 400° C. Such process for preparing polydiorganosiloxane-polyorgano block copolymers is also applicable using polycarbonates as the polymer.

The polyester has repeating units consisting of the group of the general formulas:

a) $-[R^2-C(=O)-O-]_x-$, wherein x is at least 2, and $R^2$ is independently selected from optionally substituted divalent organic residues having up to 30 carbon atoms, which are bound via a carbon atom to the adjacent carbonyl carbon atom, and b) $-[R^3-O-C(=O)-R^4-C(=O)-O-]_x-$, wherein x is at least 2, $R^3$ is independently selected from optionally substituted divalent organic residues having up to 30 carbon atoms, and $R^4$ is independently selected from optionally substituted divalent organic residues having up to 30 carbon atoms, which are bound via a carbon atom to the adjacent carbonyl carbon atom. $R^2$, $R^3$ and $R^4$ are independently selected from optionally substituted divalent organic residues having up to 30 carbon atoms. $R^2$, $R^3$ and $R^4$ may include for example aliphatic and/or aromatic residues having up to 30, preferably up to 20 carbon atoms, which may be optionally substituted by one or two substituent groups and optionally comprise one or more heteroatom.

The term "solventless melt" in the context of the present invention refers to a melt of the above mentioned polymer and the composition according to the invention, which essentially does not contain any solvent, i.e. a solvent that is added as such to the composition. Generally the solventless melt does not contain more than 10 wt-%, preferably does not contain more than 5 wt-%, still more preferably does not contain more than 1 wt-% solvent. The by-products, of in particular, transesterification reactions are not considered as solvents.

The diorganocarbonates are preferably selected from diarylcarbonates and the organodiester is preferably selected from diaryl dicarboxylates.

Preferred diarylcarbonates are selected from diphenyl carbonate or dicresyl carbonate, and the preferred diaryl dicarboxylates are selected from diphenyl isophthalate or diphenyl terephthalate.

Preferred catalysts are selected from the group consisting of hydroxides, alkoxides, phenoxides, and borates of tetraorganoammonium and tetraorganophosphonium.

In a preferred embodiment, the composition according to the invention is first reacted with diorganocarbonates and/or organodiester to form linear carbonate-functional and/or ester-functional polydiorganosiloxanes, which are then reacted with the polymer.

In a preferred embodiment of the invention the polymer is selected from the group of oligomers of a polyester having repeating units consisting of the group of the general formulas:

a) —[R$^2$—C(=O)—O—]$_x$—, wherein x is at least 2, and R$^2$ is independently selected from optionally substituted divalent organic residues having up to 30 carbon atoms, which are bound via a carbon atom to the adjacent carbonyl carbon atom, and b) —[R$^3$—O—C(=O)—R$^4$—C(=O)—O—]$_x$—, wherein x is at least 2, R$^3$ is independently selected from optionally substituted divalent organic residues having up to 30 carbon atoms, and R$^4$ is independently selected from optionally substituted divalent organic residues having up to 30 carbon atoms, which are bound via a carbon atom to the adjacent carbonyl carbon atom, a polysulfone, a polyetherimide and a polyether ether ketone represented by formulae (Va), (Vb), (Vc), (VI), (VII) and (VIII), respectively:

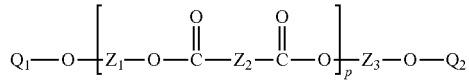
(Va)

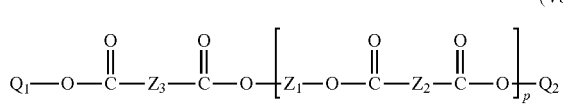
(Vb)

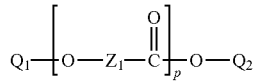
(Vc)

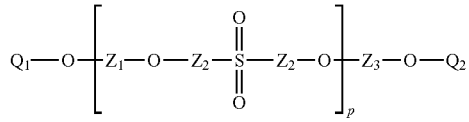
(VI)

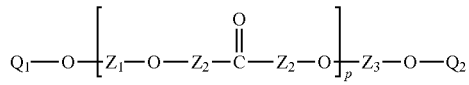
(VII)

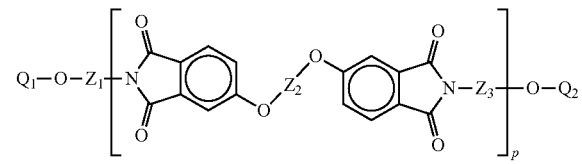
(VIII)

wherein each of Z, $Z_1$, $Z_2$, and $Z_3$ is independently selected from divalent substituted or unsubstituted alkyl, aryl, and bisarylalkyl groups each having up to 30 carbon atoms, $Q_1$ and $Q_2$ are independently selected from the group consisting of hydrogen, and a —C(=O)—X group, wherein X is selected from the group consisting of hydroxy, alkyloxy, alkyl-substituted aryloxy, and aryloxy, each having up to 30 carbon atoms, and p is a number between 2 and 300.

Z, $Z_1$, $Z_2$, and $Z_3$ may also suitably include bisaryloxy groups having up to 30 carbon atoms, and such process is also applicable to oligomers of polycarbonates of the formula (IV):

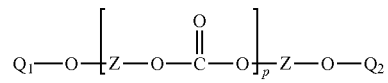
(IV)

wherein $Q_1$, $Q_2$, Z and p are as defined above.

The process of the invention to form the polydiorganosiloxane-polyorgano block copolymers, comprises preferably the additional step of first mixing of component (A) and component (B) and optionally one or more polar organic compounds having up to 30 preferably up to 20 carbon atoms and at least one hetero atom, preferably selected from O, N and S, then contacting this mixture with the one or more polymers and optionally bisphenolic compounds, diorganocarbonates and/or organodiesters and an optional catalyst as described above, in a solventless melt. A preferred polar organic compound is selected from saturated and unsaturated alcohols, preferably primary alcohols having up to 20 carbon atoms, wherein the latter is removed thereafter by distillation or as a byproduct of the melt process.

In a further aspect the present invention relates to the use of the composition according to the invention for the manufacture of polysiloxane-modified polymers, in particular modified thermoplastics, often referred to as engineering plastics, and thermoplastic elastomers. The inventive polysiloxane-modified polymers can also find use in adhesives, bonding compounds, insulators or as components in protective or decorative coatings.

In a further aspect the present invention relates to the polysiloxane-modified polymers, obtained by reacting polymers with the composition according to the invention.

In a further aspect the present invention relates to a process for the manufacture of the composition according to the invention. Such process usually comprises the step of mixing a component (A) with a component (B), optionally heating the mixture for example to more than 50° C. and up to 300° C. until the mixture becomes clear and then cooling to room temperature (e.g. 25° C.). Such composition obtained by mixing the components (A) and (B) and having the required content of component (B) basically is the composition according to the invention. To facilitate the incorporation of component (B) into the component (A) a polar organic compound or solvent, respectively might be used optionally. Such polar organic compound or solvent might be removed completely or partially after forming the composition of the invention, and it might be also left in the composition if it doesn't disturb the subsequent polymer formation reaction.

A preferred for the manufacture of the composition according to the invention comprises the steps of:

i) preparing component (A),
ii) determination of the concentration of component (B) present after the preparation of component (A),
iii) adjusting the concentration of component (B) by adding a component (B) (which might be different from the one already present in (A), optionally using or adding respectively a polar organic compound as solvent. A preferred polar organic compound is polar organic compounds having up to 30 preferably up to 20 carbon atoms and at least one hetero atom, preferably selected from O, N and S. A preferred polar organic compound is selected from alcohols, preferably primary alcohols having up to 20 carbon atoms, wherein the latter is removed thereafter by distillation or as a byproduct of the melt process.

The optional polar organic compound can be any organic compound that helps make component (B) more soluble in component (A) and does not have a detrimental effect upon formation of the inventive block copolymers or their properties. In particular, the polar organic compound can be selected from the group consisting of organic ketones, esters and alcohols. Preferred are saturated and unsaturated organic alcohols, especially primary alcohols with up to 20 carbon atoms, such as 1-octanol, 1-decanol, 2-ethylhexanol, 1-dodecanol, 1,2-octanediol, benzyl alcohol, butyldiglycol, phenoxyethanol, trimethylolpropane, mono- and dialkylethers of trimethylolpropane, tridecylalcohol and isomers thereof, ethylhexylglycerin and oleoyl alcohol. Especially preferred are polar organic compounds with boiling points of less than 300° C. (1.01325 bar).

The process can optionally involve in a step (iv) the use of heat (e.g. a temperature of 50 to 300° C.) and/or reduced pressure to promote the formation of an intimate mixture. In such step the polar organic compound optionally used as a process aid may be removed partially or completely.

In further preferred embodiments, the polydiorganosiloxanes (A) are represented by the following formulas:

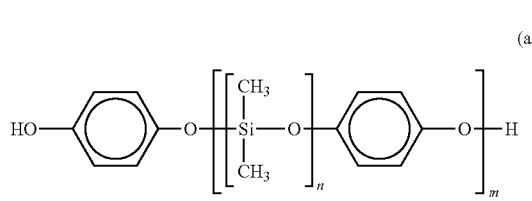

(a)

wherein in formula (a)
n is as defined above and m is an average value of 1 to 10, preferably 2.0 to 5.0, the value of n times m is between 12 and 400, preferably between 15 and 200,

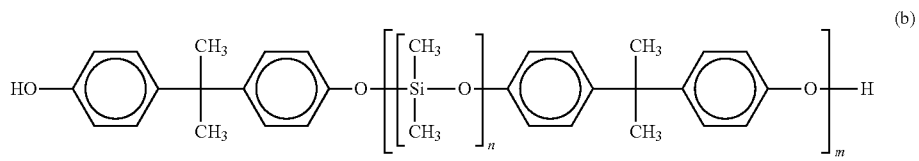

(b)

wherein in formula (b)
n and m are as defined,

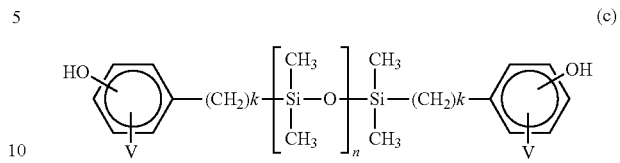

(c)

wherein in formula (c) n is as defined above, k is 2 or 3, and V is independently in each occurrence a hydrogen, C1-C20 alkyl, C1-C20 alkoxy group or a halogen atom.

The polydiorganosiloxanes, preferably the hydroxyaryl-terminated polydiorganosiloxanes (A) can be prepared by processes known in the art. For example, hydroxyaryl-terminated polydiorganosiloxanes (A) of the general Formula I can be prepared by the step of reacting a linear α,ω-bisacyloxypolydialkylsiloxane of the general Formula (d) with at least one bisphenolic compound, or a hydroxy-functional oligomer thereof, wherein the general Formula (d) is

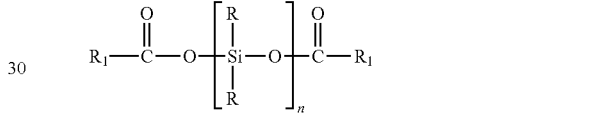

(d)

wherein each occurrence of R and R₁ is as defined above e.g. independently a monovalent C1 to C20 alkyl, alkylaryl, or aryl group, and n is as defined above.

The hydroxyaryl-terminated polydiorganosiloxanes (A) of the general Formula (II) can be prepared e.g. by processes known in the art, including the platinum-catalyzed reaction of a linear hydrogensiloxane of the general Formula (e) with an aliphatically unsaturated monohydridic compounds. Formula (e):

(e)

wherein each occurrence of R is as defined above.

Examples of suitable aliphatically unsaturated monohydridic compounds are, for example, 4-allylphenol, 2-allylphenol, 4-allyl-2-methylphenol, 2-allyl-4,6-dimethylphenol, 4-allyl-2-methoxyphenol, 2-allyl-4-methyl-6-methoxyphenol, 4-hydroxybenzoic acid allylether, allyl monoglycolether, allyl diglycolether, 6-hydroxyhexanoic acid allylether, and 15-hydroxypentadecanoic acid allylether.

In the present invention n has an average value of 10 to 400, specifically 10 to 100 and most specifically 12 to 50; m has an average value of greater than or equal to one, specifically between 1.0 and 10.0, the value of n times (m) is between 12 and 800, advantageously between 15 and 200; R and $R_1$ are as defined above, most specifically R and $R_1$ are either methyl or phenyl.

As explained already above the preferred component (B) i.e. an organic or inorganic salt is preferably selected from the group consisting of alkali metal, earth alkaline metal, quaternary ammonium or quaternary phosphonium salts of weak organic acids, phosphates, or borates. Preferred are the salts of organic carboxylates, dialkyl or diarylphosphates or tetraalkyl or tetraaryl borates. Especially preferred are alkali metal and quaternary phosphonium carboxylates. Most especially preferred are the sodium and potassium salts of C6-C30 alkyl, aryl or alkylaryl carboxylates.

The component (B) should be present in a level to accelerate the reaction of the component (A), e.g. linear hydroxyhydrocarbyl-functional polydiorganosiloxanes with the polymers (the term polymer includes also oligomers, e.g. more than one repeating unit), in particular polycarbonate, polyester, polyetherimide, polyether ether ketone, or polysulfone oligomers and optionally one or more compounds selected from the group consisting of bisphenolic compounds, diorganocarbonates and organodiesters, e.g. diphenylcarbonate or diaryl organodiesters, to make homogeneous block copolymers, in the solventless melt process at temperatures of 160-400° C., preferably at temperatures between 220 and 350° C., optionally in the presence of a catalyst. However, the component (B) should not be present in a level to cause excessive side-reactions, such as cross-linking, or to be detrimental to the properties of the resulting block copolymer.

Preferred compositions comprise 0.5 to 1000 ppm of component (B), more specifically 1 to 100 ppm of the component (B) based on the total of weight of (A) and (B). Especially preferred the inventive compositions comprise component (B) at levels of between 0.02 and 5.0 mmol/kg, specifically comprising levels of between 0.04 and 1.0 mmol/kg, most specifically comprising levels of between 0.04 and 0.5 mmol/kg.

The composition of the invention can be used to make polysiloxane—polyorgano block copolymers.

Accordingly, in another preferred embodiment, the present invention provides a solventless melt process, e.g. a solventless transesterification process to prepare the polysiloxane-polyorgano block copolymers. The solventless transesterification, or melt processes are generally known and have been described in U.S. Pat. Nos. 5,504,177; 5,340,905; 5,421,061; 5,783,651; 5,821,321; 6,506,871 and 6,066,700, all of which are incorporated herein by reference in their entireties. The solventless transesterification melt processes of the invention include e.g. the step of reacting the composition of the invention, with polycarbonate, polyester, polyetherimide, polyether ether ketone or polysulfone oligomers and optional bisphenolic compounds, diarylcarbonates or diesters, in a solventless melt with removal of the transesterification by-products by distillation, whereby condensation of the terminal groups on the polysiloxanes (A) with the ester or carbonate groups of the oligomers, or the diarylcarbonates or organodiesters, leads to the formation of new linkages between the block segments, schematically shown in the following:

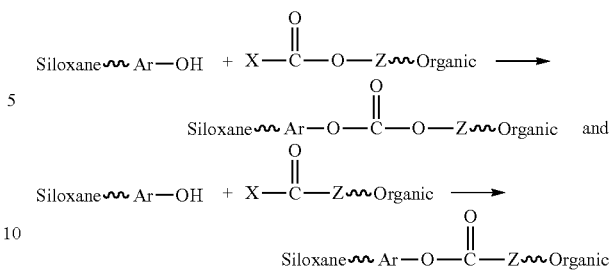

(wherein X corresponds here to $R^1$.) This process may optionally include the use of monofunctional chain terminating agents, such as phenol or C6 to C12-alkylphenols, as for example described in U.S. Pat. No. 4,732,949, and catalysts known in the art.

Suitable catalysts for the process of preparing polydiorganosiloxane-polyorgano block copolymers are quaternary ammonium or quaternary phosphonium catalysts as known in the art. It is advantageous that such catalysts be added to the polymers described above and that the inventive composition comprising an intimate mixture of component (A) and component (B) is then added and the resulting mixture is heated while applying mixing shear under vacuum to achieve formation of the block copolymer. Alternatively the catalyst is added to a mixture of the inventive composition comprising an intimate mixture of component (A) and component (B) and the polymer or polymers.

In an additional aspect of the invention, condensation of the polydiorganosiloxanes (A) with polycarbonate oligomers can also include co-condensation with mono or diester compounds or polyester oligomers to form polysiloxane-polyester-polycarbonate triblock copolymers.

In an additional aspect of the current invention, the composition of the invention comprising the polysiloxanes (A) and the organic or inorganic salt (B) is first reacted with diarylcarbonates or organodiesters to form linear carbonate-functional or ester-functional polysiloxanes, which are then reacted with polymeric oligomers like e.g. polycarbonate, polyesters having repeating units consisting of the group of the general formulas:

a) —[$R^2$—C(=O)—O—]$_x$—, wherein x is at least 2, and $R^2$ is independently selected from optionally substituted divalent organic residues having up to 30 carbon atoms, which are bound via a carbon atom to the adjacent carbonyl carbon atom, and b) —[$R^3$—O—C(=O)—$R^4$—C(=O)—O—]$_x$—, wherein x is at least 2, $R^3$ is independently selected from optionally substituted divalent organic residues having up to 30 carbon atoms, and $R^4$ is independently selected from optionally substituted divalent organic residues having up to 30 carbon atoms, which are bound via a carbon atom to the adjacent carbonyl carbon atom, polyetherimide, polyether ether ketone, or polysulfone oligomers, and optional bisphenolic compounds, in the solventless melt process.

The bisphenolic compounds used in the process for preparing the polydiorganosiloxanes (A) of formula (I) or the bisphenolic compounds used in the process of preparing the polydiorganosiloxane-polyorgano block copolymers of the invention include bisphenolic compounds described in U.S. Pat. Nos. 4,732,949 and 5,109,076 or their oligomers, wherein the contents of the '949 and the '076 patents are incorporated herein by references in their entireties. Suitable bisphenolic compounds or the oligomers thereof are those of the following structures:

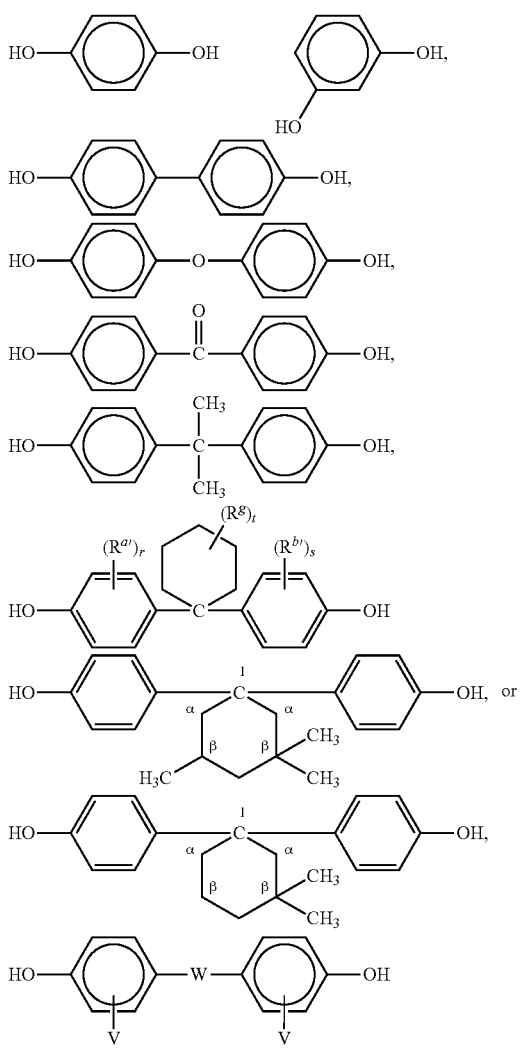

wherein V and W are as defined above. Advantageously, at least 90% of the bisoxyaryl groups in the oligomers are derived from the preferred bisphenolic compounds described above.

The polysiloxane-polyorgano block copolymers prepared according to the process of the present invention can be prepared at low cost and in good yields with very low levels of interfering impurities, in particular inorganic salts and strong bases. In addition, the polysiloxane-polyorgano block copolymers of the present invention exhibit improved control of the block domain structure in molded articles. This leads to improved and reproducible physical properties such as melt stability and low temperature impact resistance as well as hydrolysis and chemical resistance. The polysiloxane-polyorgano block copolymers of the invention also exhibit better surface tension properties that can lead to improved mold flow and chemical resistance properties as compared with the block copolymers prepared by the prior art processes.

The following examples are intended to illustrate, but in no way limit the scope of the present invention. All percentages are by weight based on the total weight of the composition and all temperatures are in degrees Celsius unless explicitly stated otherwise.

Test Methods

Determination of Melt Volume Flow Rate (MVR):
The melt volume flow rate (MVR) (Melt Flow/Volume Rate) is determined according to ISO 1133 (at 300° C.; 1.2 kg), unless any other conditions have been described.

Determination of Solution Viscosity (Eta Rel):
The relative solution viscosity (etarel; also referred to as eta rel) was determined in dichloromethane at a concentration of 5 g/l at 25° C. with an Ubbelohde viscometer.

Determination of the Extractable Siloxane Content:
The extractable siloxane content was determined by precipitation of the copolymer in n-hexane. For this purpose, 5 g of product were dissolved in 60 ml of dichloromethane and gradually added dropwise to 750 ml of n-hexane at room temperature and while stirring. In the course of this, the copolymer precipitates out and settles out. The unincorporated siloxane, in contrast, remains in solution (siloxane components is soluble in n-hexane). The precipitated polymer is filtered off and dried. A 1H NMR spectrum of the precipitated block copolymer and of the copolymer prior to precipitation are recorded. The decrease in the dimethylsiloxane signal at 0 ppm is evaluated compared to the signal for the isopropylidene group at 1.67 ppm.

COMPARATIVE EXAMPLE A

In a reaction flask equipped with a thermostatic heater, stirrer, thermometer, and reflux condenser, 700 g of an α,ω-bisacyloxypolydimethylsiloxane, with an average chain length of 31.8 dimethylsiloxy units as determined by $^{29}$Si NMR and 570 mmoles of acyloxy terminal groups, was added dropwise over 4 hours to a solution of 52.9 g (480 mmoles) hydroquinone in 224 g xylenes, 140 g acetic acid and 1.4 g of anhydrous sodium acetate, while heating to a mild reflux at 110° C. After complete addition the clear solution was stirred for an additional hour. Then the solvents and volatiles were removed by vacuum distillation to 125° C. and 60 mbar presure. After cooling to 50° C., 200 g xylene was added. The crude product solution was cooled to less than 20° C. for 2 days then filtered over a 3 micron filter (Seitz K300). The filtered solution was then stripped of solvent and residual volatiles at 140° C. and 3 mbar and cooled to less than 30° C. Filtration over a 3 micron filter gave 610 g (81% theory) of a linear hydroxyaryl-functional polydimethylsiloxane as a clear, colorless liquid, which comprises the following structure and characteristics:

Structure:

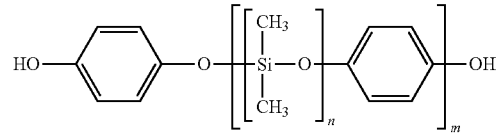

NMR (found): n=33.7; m=3.7;
Viscosity (23° C.): 358 mPa·s;
% solids (160° C., 30 min): 98.24%;
$n_D^{23}$=1.4148;
Hydroxy content: 11.9 mg KOH/g; and
Na content: 0.1 ppm (0,004 mmol/kg)

Preparation of a Polydiorganosiloxane-Polyorgano Block Copolymer 2.5 parts of the above hydroxyaryl-functional polysiloxane and 47.5 parts of a polycarbonate polymer with an eta rel solution viscosity of 1.203, and 0.071 parts of tetraphenylphosphonium phenolate (TPPP) were weighed into a glass reactor with a stirrer and short-path separator. The apparatus was evacuated and vented with nitrogen three times. The mixture was melted by means of a metal bath preheated to 350° C. und nitrogen, then agitationed for 30 minutes while applying a vacuum of 1.5 mbar. The reactor was vented with nitrogen, cooled and the copolymer removed. The resulting copolymer had an eta rel solution viscosity of only 1.28 and had an inhomgeneous copolymer structure with individual polysiloxane domains larger than 10 microns, as indicated by atomic force microscopy. Extraction of the polymer with $CH_2Cl_2$ and precipitation with n-hexane as described above found in excess of 50% unbound polysiloxane.

EXAMPLE 1

To 20.1 kg of a linear hydroxyaryl-functional polysiloxane prepared according to Comparative Example A with a hydroxyl content of 14.3 mg KOH/g and an initial sodium content of 0.2 ppm (component (B)) was added 0.33 g of sodium benzoate as additional component (B). The polymer was heated with agitation to 95° C. until becoming clear, then cooled. The resulting polymer after addition of component (B) had a sodium content of 2.5 ppm (0.109 mmol/kg).

Reaction of the above polysiloxane polymer (A) containing the sodium benzoate (B) with the polycarbonate polymer used in comparative example A and TPPP under conditions identical to those in Comparative Example A, gave a white silicone-polycarbonate block copolymer with an eta rel solution viscosity of 1.377. The block copolymer was found to have excellent melt stability, as indicated in Table 2, whereby the polymer molecular weight as indicated by the MVR value was unchanged after 20 minutes at 300° C. The block copolymer was also found to have good solvent resistance and hydrolysis resistance. The block copolymer structure was found to be uniform according to atomic force microscopy with an average polysiloxane domain size of less than 1 micron. Extraction of the copolymer as in Example A found <15% unbound polysiloxane. Also the Charpy-notched impact test at 10° C. of a 3 mm bar was unchanged, and still ductile, after ageing at 85° C. and 85% relative humidity for 300 hours.

EXAMPLE 2

To a linear hydroxyaryl-functional polysiloxane prepared according to Comparative Example A with a hydroxyl content of 14.3 mg KOH/g was added sodium acetate to achieve a sodium content of 1.3 ppm (0.06 mmol/kg). Reaction of this polysiloxane polymer containing sodium acetate with the polycarbonate of Comparative Example A and TPPP under conditions identical to those in Example 1 gave a silicone-polycarbonate block copolymer with an eta rel solution viscosity of 1.38, a MVR value at 300° C. (ISO 1133) of 8.33. The block copolymer was found to have excellent melt stability as indicated in Table 2. The copolymer was found to have a tensile strength of 59 N/mm$^2$, an elongation at break of 106%, a Vicat temperature (B50: 50 N/50° K/h) of 146° C., as well as good solvent resistance and hydrolysis resistance. The block copolymer structure was found to be uniform according to atomic force microscopy with an average siloxane domain size of less than 1 micron. The block copolymer was found to have good low temperature impact resistance as indicated by an Izod notched impact test value (ISO 180/1A) of 50 kJ/m$^2$ (ductil, 10/10 samples) at −50° C.

COMPARATIVE EXAMPLE B

To 180 g of a linear hydroxyaryl-functional polysiloxane (A) prepared according to Comparative Example A with a hydroxyl content of 14.3 mg KOH/g and an initial sodium content of 0.2 ppm was added 0.45 g of sodium benzoate and 50 g of mixed xylenes. The polymer solution was heated to 120° C. and vacuum stripped to remove the xylene, becoming clear. The resulting polymer upon cooling was turbid and had a sodium content of 310 ppm (13.5 mmol/kg component (B)).

Reaction of the above polysiloxane polymer containing sodium benzoate with the oligomeric polycarbonate of Comparative example A and TPPP under conditions identical to those in Example 1 gave an inhomogeneous, highly crosslinked copolymer that was largely insoluble.

EXAMPLE 3

To a linear hydroxyaryl-functional polysiloxane (A) prepared according to Comparative Example A was added the organic and inorganic salts (B) of Table 1 and then reacted with polycarbonate oligomer of Comparative Example A and TPPP under conditions identical to those in Example 1. The resulting polysiloxane-polyorgano block copolymers had the properties in Table 1.

TABLE 1

| Example | OH-Number mg KOH/g | Initial Component (B) Content [mmol/kg] | Added Component (B) | Component (B) [mmol/kg] | Copolymer (C) eta rel. viscosity | Copolymer Appearance |
|---|---|---|---|---|---|---|
| Comp. Exp. A | 11.9 | 0.004 | None | 0.004 | 1.28 | Inhomogeneous |
| Comp. Exp. B | 14.3 | 0.004 | Sodium Acetate | 13.5 | n.m. | Inhomogeneous, crosslinked |
| 1 | 14.3 | 0.008 | Sodium Benzoate | 0.109 | 1.377 | Homogeneous |
| 2 | 14.3 | 0.008 | Sodium Acetate | 0.06 | 1.380 | Homogeneous |
| 3a | 15.6 | 0.004 | Na 4-Methoxy-Benzoic Acid | 0.13 | 1.358 | Homogeneous |

TABLE 1-continued

| Example | OH-Number mg KOH/g | Initial Component (B) Content [mmol/kg] | Added Component (B) | Component (B) [mmol/kg] | Copolymer (C) eta rel. viscosity | Copolymer Appearance |
|---|---|---|---|---|---|---|
| 3b | 15.6 | 0.004 | Na 3-Methyl-Benzoic Acid | 0.13 | 1.398 | Homogeneous |
| 3c | 15.6 | 0.004 | Sodium Oleate | 0.13 | 1.373 | Homogeneous |

TABLE 2

| Example | OH-Number | Added Component (B) | Comp. B mmol/kg | MVR 300° C. initial | MVR 300° C. 20 minutes | Comment |
|---|---|---|---|---|---|---|
| 1 | 14.3 | Sodium Benzoate | 0.109 | 10.7 | 10.8 | Stable at 85° C. and 85% rH for 300 h |
| 2 | 14.3 | Sodium Acetate | 0.06 | 8.33 | 8.36 | |

If higher levels of the component (B) are used in the polysiloxanes (A) and admixed with the polymers to be modified then the resulting polydiorganosiloxane-polyorgano block copolymers are colored, and can exhibit high levels of crosslinking. If the salt, the component (B) at concentration level according to the invention, is added directly into a mixture of the polymer then the resulting reaction mixture does not exhibit the inventive higher reactivity.

What is claimed is:

1. A composition comprising:
   (A) one or more polydiorganosiloxanes selected from the formulas (I) and (II):

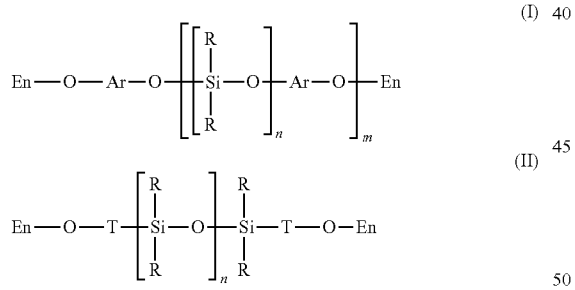

wherein each occurrence of
En is independently selected from the group consisting of hydrogen and —C(=O)—OR$^1$, wherein R$^1$ is selected from the group consisting of alkyl, alkylaryl, and aryl groups, each group having up to 30 carbon atoms,
T is independently selected from the group consisting of divalent optionally substituted hydrocarbyl residues having up to 60 carbon atoms, optionally comprising one or more heteroatoms, said group T being bond to Si and O-En via a carbon atom, which groups T are selected from (Si shown for indicating binding direction of T):

Si-(alkyl)-(aryl)-

Si-(alkyl)-O-(aryl)-

Si-(alkyl)-O—C(O)-(aryl)-, and

Si-(alkyl)-O-(alkyl)-,

Ar is independently selected from the group consisting of divalent aromatic residues having up to 60 carbon atoms which can be independently from each other substituted with a substituent selected from the group consisting of halogen, alkyl and alkoxy groups,
R is an organic group having up to 30 carbon atoms,
n is an average value of from 10 to 400, and
m is an average value of from 1 to 10
and
   (B) 0.02 to 5.0 mmol/kg of the total of weight of (A) and (B) of one or more organic or inorganic salts selected from the group consisting of alkali metal salts and alkaline earth metal salts.

2. The composition of claim 1, wherein the organic or inorganic salt is selected from the group consisting of salts of acids having a pK$_A$ of 3 to 7 (25° C.).

3. The composition of claim 1, wherein the organic or inorganic salt is selected from the group of alkali metal salts of carboxylic acids.

4. The composition of claim 1, wherein R is selected from the group consisting of methyl and phenyl.

5. The composition of claim 1, wherein Ar is represented by the following formula (III):

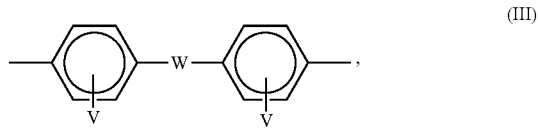

wherein W is selected from the group consisting of a single bond, an oxygen atom, a carbonyl group, a sulfur atom, a SO$_2$ group, a divalent C1-C20 aliphatic radical and a divalent C5-C20 cycloaliphatic radical and V shall represent the substituent groups at the phenyl moieties which are independently selected from the group consisting of hydrogen, C1-C20 alkyl, C1-C20 alkoxy and halogen atoms, and/or
Ar is selected from:

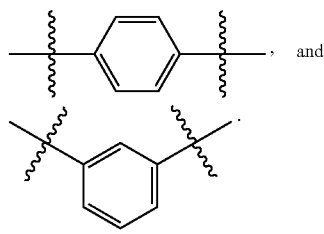

6. A process for preparing polydiorganosiloxane-polyorgano block copolymers, wherein the process comprises reacting a composition according to claim 1 with a polymer selected from the group consisting of:
polyester having repeating units consisting of the group of the general formulas:
a) $-[R^2-C(=O)-O-]_x-$, wherein x is at least 2, and $R^2$ is independently selected from optionally substituted divalent organic residues having up to 30 carbon atoms, which are bound via a carbon atom to the adjacent carbonyl carbon atom, and
b) $-[R^3-O-C(=O)-R^4-C(=O)-O-]_x-$, wherein x is at least 2, $R^3$ is independently selected from optionally substituted divalent organic residues having up to 30 carbon atoms, and $R^4$ is independently selected from optionally substituted divalent organic residues having up to 30 carbon atoms, which are bound via a carbon atom to the adjacent carbonyl carbon atom,
polyetherimide (PEI),
polyether ether ketone (PEEK), and
polysulfone, and
optionally one or more compounds selected from the group consisting of bisphenolic compounds, diorganocarbonates and organodiesters, optionally in the presence of a catalyst in a solventless melt at a temperature in the range of 160 and 400° C. with removal of the by-products by distillation.

7. The process according to claim 6, wherein En is hydrogen and wherein said composition is first reacted with diorganocarbonates and/or organodiesters to form linear carbonate-functional and/or ester-functional polydiorganosiloxanes, which are then reacted with the polymer.

8. The process of claim 6, wherein the polymer is selected from the group of oligomers of a polyester having repeating units consisting of the group of the general formulas:
a) $-[R^2-C(=O)-O-]_x-$, wherein x is at least 2, and $R^2$ is independently selected from optionally substituted divalent organic residues having up to 30 carbon atoms, which are bound via a carbon atom to the adjacent carbonyl carbon atom, and
b) $-[R^3-O-C(=O)-R^4-C(=O)-O-]_x-$, wherein x is at least 2, $R^3$ is independently selected from optionally substituted divalent organic residues having up to 30 carbon atoms, and $R^4$ is independently selected from optionally substituted divalent organic residues having up to 30 carbon atoms, which are bound via a carbon atom to the adjacent carbonyl carbon atom,
a polysulfone, a polyetherimide and a polyether ether ketone represented by formulae (Va), (Vb), (Vc), (VI), (VII) and (VIII), respectively:

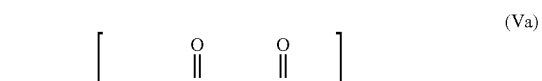

(Va)

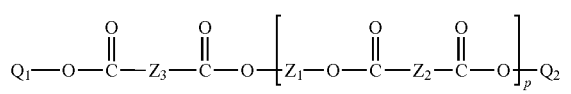

(Vb)

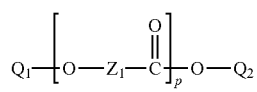

(Vc)

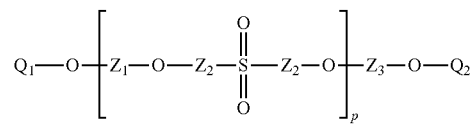

(VI)

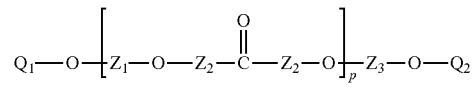

(VII)

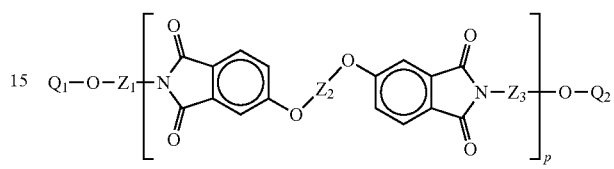

(VIII)

wherein each of Z, $Z_1$, $Z_2$, and $Z_3$ is independently selected from divalent substituted or unsubstituted alkyl, aryl, and bisarylalkyl each having up to 30 carbon atoms, $Q_1$ and $Q_2$ are independently selected from the group consisting of hydrogen, and a $-C(=O)-X$ group, wherein X is selected from the group consisting of hydroxy, alkyloxy, alkyl-substituted aryloxy, and aryloxy, each having up to 30 carbon atoms, and p is a number between 2 and 300.

9. The process of claim 6, further comprising mixing of component (A) and component (B) and optionally one or more polar organic compounds having up to 30 carbon atoms.

10. The process of claim 9, which comprises the step of first mixing of component (A) and component (B) and one or more polar organic compounds selected from the group consisting of saturated and unsaturated organic alcohols with on average up to 20 carbon atoms.

11. A polysiloxane-modified polymer, obtained by reacting at least one polymer selected from the group consisting of
polyester having repeating units consisting of the group of the general formulas:
a) $-[R^2-C(=O)-O-]_x-$, wherein x is at least 2, and $R^2$ is independently selected from optionally substituted divalent organic residues having up to 30 carbon atoms, which are bound via a carbon atom to the adjacent carbonyl carbon atom, and
b) $-[R^3-O-C(=O)-R^4-C(=O)-O-]_x-$, wherein x is at least 2, $R^3$ is independently selected from optionally substituted divalent organic residues having up to 30 carbon atoms, and $R^4$ is independently selected from optionally substituted divalent organic residues having up to 30 carbon atoms, which are bound via a carbon atom to the adjacent carbonyl carbon atom,
polyetherimides,
polyether ether ketones, and
polysulfones with the composition according to claim 1.

12. A process for the manufacture of the composition according to claim 1, which comprises the steps of:
i) preparing component (A),
ii) determination of the concentration of component (B) present after the preparation of component (A),
iii) adjusting the concentration of component (B), optionally using a polar organic compound.

13. A process for the manufacture of the composition according to claim 1, which comprises the steps of:

i) preparing component (A),
ii) determination of the concentration of component (B) present after the preparation of component (A),
iii) adjusting the concentration of component (B) using a polar organic compound,
iv) applying heat and/or reduced pressure to obtain an intimate mixture.

14. The process according to claim 12, which comprises the step of mixing of component (A) and component (B) and one or more polar organic compounds selected from the group consisting of saturated and unsaturated organic alcohols with on average up to 20 carbon atoms.

\* \* \* \* \*